(12) United States Patent
Yin et al.

(10) Patent No.: US 10,425,192 B2
(45) Date of Patent: Sep. 24, 2019

(54) LOSS-RESILIENT PROTOCOLS FOR COMMUNICATION NETWORKS

(71) Applicant: The Chinese University of Hong Kong, Shatin, New Territories (CN)

(72) Inventors: Ho Fai Hoover Yin, Hong Kong (CN); Shenghao Yang, Hong Kong (CN); Wai-Ho Raymond Yeung, Hong Kong (CN)

(73) Assignee: The Chinese University of Hong Kong, Shatin, N.T., Hong Kong (CN)

( * ) Notice: Subject to any disclaimer, the term of this patent is extended or adjusted under 35 U.S.C. 154(b) by 257 days.

(21) Appl. No.: 14/871,257

(22) Filed: Sep. 30, 2015

(65) Prior Publication Data
US 2017/0093666 A1    Mar. 30, 2017

(51) Int. Cl.
*H04L 1/00* (2006.01)
*H04L 12/863* (2013.01)

(52) U.S. Cl.
CPC .......... *H04L 1/0071* (2013.01); *H04L 1/0076* (2013.01); *H04L 47/6225* (2013.01); *H04L 2001/0097* (2013.01)

(58) Field of Classification Search
CPC ....... H04L 1/006; H04L 45/123; H04L 47/82; H04L 67/02; H04L 1/0071; H04L 1/0076; H04L 47/6225; H04L 2001/0097
See application file for complete search history.

(56) References Cited

U.S. PATENT DOCUMENTS

| | | | |
|---|---|---|---|
| 2009/0003216 A1* | 1/2009 | Radunovic | H04L 45/123 370/237 |
| 2009/0310498 A1* | 12/2009 | Nogami | H04L 1/0006 370/252 |
| 2012/0155531 A1* | 6/2012 | Yi | H03M 13/356 375/240 |
| 2013/0235744 A1* | 9/2013 | Chen | H04L 47/82 370/252 |
| 2014/0376366 A1* | 12/2014 | Li | H04L 45/16 370/230 |
| 2014/0379858 A1* | 12/2014 | Mahdaviani | H04L 67/02 709/217 |
| 2015/0303950 A1* | 10/2015 | Shattil | H04B 1/0003 370/328 |

OTHER PUBLICATIONS

Shenghao Yang et al, BATS: Network Coding in Action, 2014, IEEE, pp. 1204-1211 (Year: 2014).*

* cited by examiner

*Primary Examiner* — Michael Thier
*Assistant Examiner* — Prince A Mensah
(74) *Attorney, Agent, or Firm* — Kilpatrick Townsend & Stockton LLP

(57) ABSTRACT

BATS protocols may be utilized for high efficiency communication in networks with burst or dependent type losses. Systematic recoding at intermediate network nodes may be utilized to reduce the computational cost during recoding. A block interleaver based BATS protocol may be utilized to handle burst loss, where batches are recoded to a same number of packets. Adaptive recoding may be utilized to improve the throughput, where a batch with a higher rank is recoded to a larger number of packets. Using adaptive recoding, a non-block interleaver based BATS protocol may be utilized.

20 Claims, 16 Drawing Sheets

```
Data: t_max; r_b, b ∈ L
Result: A set of optimal t_b
t ← t_max ;
t_b ← 0, ∀b ∈ L ;
foreach b ∈ L do
    if r_b ≥ t then
        t_b ← t ;
        return The set of t_b, b ∈ L ;
    else
        t_b ← r_b ;
        t ← t - r_b ;
while t > 0 do
    b ← an element in arg max_{b∈L} β_p(t_b, r_b) ;
    t_b ← t_b + 1 ;
    t ← t - 1 ;
return The set of t_b, b ∈ L ;
```

800

Data: $t_{max}$; $r_b, b \in L$ where $r_b > 0$ for all $b \in L$
Result: A set of $\hat{t}_b, b \in L$
$\ell \leftarrow t_{max}$ ;
$t_b \leftarrow 0, \forall b \in L$ ;
foreach $b \in L$ do
    if $r_b \geq \ell$ then
        $t_b \leftarrow \ell$ ;
        return The set of $t_b, b \in L$ ;
    else
        $t_b \leftarrow r_b$ ;
        $\ell \leftarrow \ell - r_b$ ;

$r \leftarrow \ell \bmod |L|$ ;
$\ell \leftarrow \lfloor \ell/|L| \rfloor$ ;
Sort $r_b, b \in L$ in descending order ;
foreach $b \in L$ do $t_b \leftarrow r_b + \ell$ ;
for *the $r$ elements with largest $r_b, b \in L$* do $t_b \leftarrow t_b + 1$ ;
return The set of $t_b, b \in L$ ;

Figure 9

Data: $t_{max}; r_b, b \in L$
Result: A set of optimal $t_b, b \in L$
$t_b \leftarrow 0, b \in L$ ;
Run an approximate algorithm to initialize $t_b, b \in \{a \in L : r_a > 0\}$ ;
while $\min_{a \in L} \beta_p(t_a - 1, r_a) < \max_{b \in L} \beta_p(t_b, r_b)$ do
    $a \leftarrow$ an element in $\arg\min_{a \in L} \beta_p(t_a - 1, r_a)$ ;
    $b \leftarrow$ an element in $\arg\max_{b \in L} \beta_p(t_b, r_b)$ ;
    $t_a \leftarrow t_a - 1$ ;
    $t_b \leftarrow t_b + 1$ ;
return The set of $t_b, b \in L$ ;

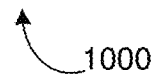

Figure 10

LOSS-RESILIENT PROTOCOLS FOR COMMUNICATION NETWORKS

FIELD OF THE INVENTION

This invention pertains generally to device-facilitated communication and, more particularly, to device-facilitated communication protocols for lossy communication networks.

BACKGROUND

Data packet loss is a common phenomenon in lossy network communications such as wireless network communications. For example, noise and/or interference can change or erase parts of a transmitted data packet. The corrupted data packets may be detected and considered as lost packets. Several techniques have been devised to recover from corrupted data packets including forward error correction and linear network coding. For many practical applications, it has been found that linear network coding has a throughput gain over forwarding in unicast and multicast networks.

The capacity of networks with packet loss for many scenarios can be achieved by using random linear network coding (RLNC). In a typical RLNC scheme, a source node transmits random linear combinations of the input packets, one or more intermediate nodes transmits random linear combinations of the packets it has received, and a destination node can decode the input packets once it has received enough coded packets with linear independent coding vectors. Erasure code is not required for each link as the network code itself can play the role of an end-to-end erasure code.

However, there are several problems to be considered when implementing RLNC schemes in practice. For example, computational costs of encoding and decoding, storage and computational costs at intermediate nodes, and overhead for coefficient vectors, to name a few. Conventional attempts to address these problems are ineffective, inefficient and/or suboptimal.

BRIEF SUMMARY

BATS protocols may be utilized for high efficiency communication in networks with burst or dependent type losses. Systematic recoding at intermediate network nodes may be utilized to reduce the computational cost during recoding. A block interleaver based BATS protocol may be utilized to handle burst loss, where batches are recoded to a same number of packets. Adaptive recoding may be utilized to improve the throughput, where a batch with a higher rank is recoded to a larger number of packets. Using adaptive recoding, a non-block interleaver based BATS protocol may be utilized.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

Illustrative embodiments of the present invention are described in detail below with reference to the following drawing figures:

FIG. 9 is a pseudocode listing representing another example algorithm for optimizing a number of data packets in each batch in accordance with at least one embodiment of the invention;

FIG. 10 is a pseudocode listing representing yet another example algorithm for optimizing a number of data packets in each batch in accordance with at least one embodiment of the invention;

DETAILED DESCRIPTION

Note that the same numbers are used throughout the disclosure and figures to reference like components and features.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

BATS code is a relatively low-complexity random linear network coding scheme that can asymptotically achieve rates very close to the capacity of a packet network with packet loss. Adoption of BATS code in practice requires a BATS code based network transmission protocol (BATS protocol). In accordance with at least one embodiment of the invention, BATS protocols are utilized for high efficiency communication in networks with burst or dependent type losses. For example, these loss types occur in many wireless communication channels including Wi-Fi, underwater and satellite communications. Although line network topologies are used as an example throughout the description, as will be appreciated by one of skill in the art, line networks are the building blocks for more general topologies, and the concepts are more widely applicable.

In accordance with at least one embodiment of the invention, systematic recoding at intermediate network nodes may be utilized to reduce the computational cost during recoding. A block interleaver based BATS protocol may be utilized to handle burst loss, where batches are recoded to a same number of packets. Adaptive recoding may be utilized to improve the throughput, where a batch with a higher rank is recoded to a larger number of packets. Using adaptive recoding, a non-block interleaver based BATS protocol may be utilized.

The terms 'digital data packet', 'data packet' and 'packet' are used interchangeably throughout the description. Such packets may carrying any suitable type of digital data including, but not limited to, audio, video or multimedia data files or streams.

Figure 1:
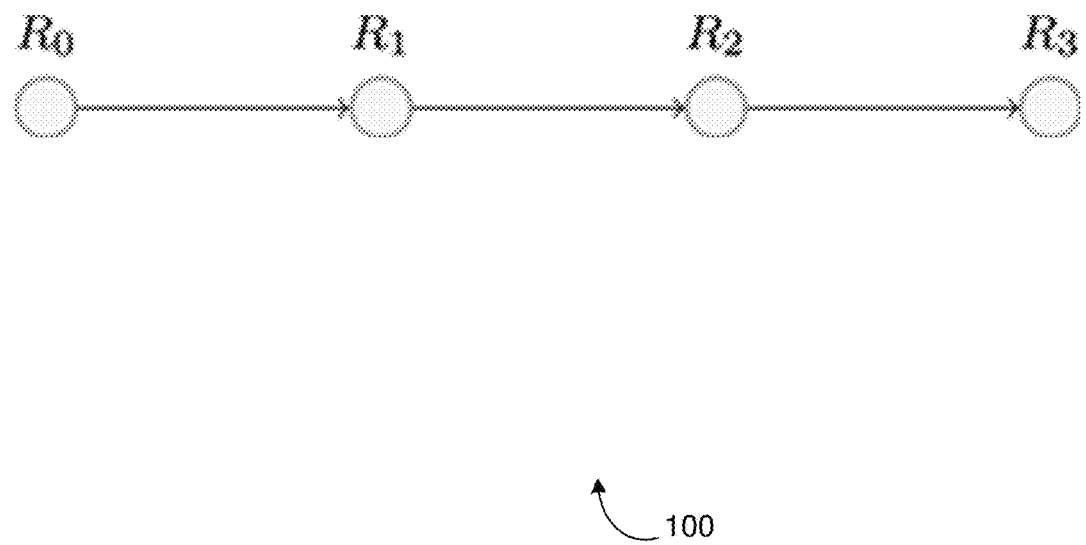
FIG. 1 is a schematic diagram depicting aspects of an example communication environment in accordance with at least one embodiment of the invention.

FIG. 1 depicts an example network 100 in accordance with at least one embodiment of the invention. The network 100 is a three-hop line network. Node R0 is the source node of one or more input data packets and/or an input data stream, node R3 is the destination node that desires to receive the (decoded) input data packets, and nodes R1 and R2 are intermediate nodes that do not necessarily desire to inspect decoded input packets. In network 100, network links exist only between two neighboring nodes, and each link is assumed to transmit one packet per timeslot. The direction of the arrows between the nodes R0, R1, R2, R3 in FIG. 1 indicates a principal direction of data flow for the input data packets, but does not preclude data flow in the reverse direction, for example, signaling data flow.

In the network 100, each node transmits data packets to the next node in the line (e.g., R0 to R1, R1 to R2, R2 to R3). Suppose packets transmitted on a network link are erased (e.g., corrupted) independently with probability p. If the intermediate nodes only apply forwarding (e.g., using forward error correction), the network throughput is upper bounded by $(1-p)^L$ after L hops. The network throughput decreases exponentially with L while the capacity of the network is $(1-p)$ packet per timeslot. In accordance with an embodiment of the invention, a batched sparse (BATS) code is provided that addresses such issues. Although, for clarity, this description often references the line network 100 of FIG. 1, the BATS codes and corresponding BATS protocols described herein may be utilized in networks having multiple source nodes and/or destination nodes such as the example network 200 depicted in FIG. 2.

Figure 2:
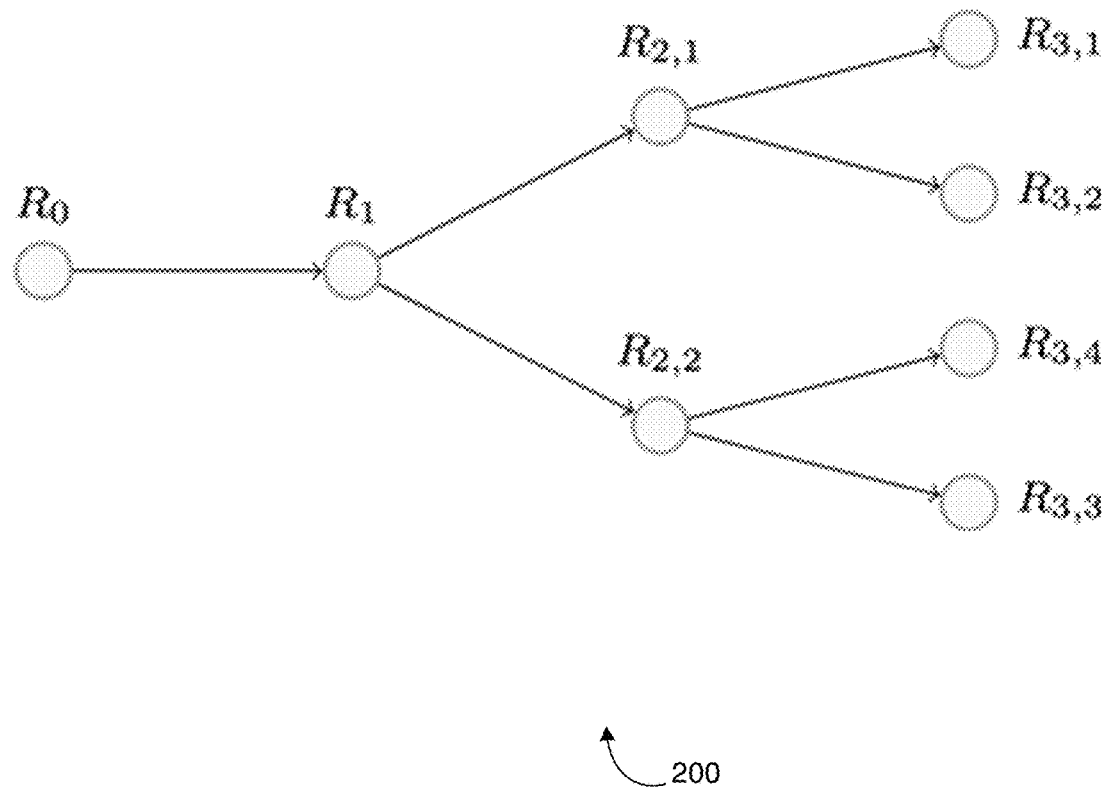
FIG. 2 is a schematic diagram depicting aspects of another example communication environment in accordance with at least one embodiment of the invention.

FIG. 2 depicts an example tree-type wireless network 200 with multicast links. Node R0 is the source node, nodes R3,1, R3,2, R3,3 and R3,4 are the destination nodes, and nodes R1, R2,1 and R2,2 are intermediate nodes that do not necessarily desire to inspect decoded input packets. In this example, the two outgoing links from each of nodes R1, R2,1, and R2,2 share corresponding common wireless channels. Again, the direction of the arrows in FIG. 2 indicate a principal direction of data flow but do not preclude data flow in the reverse direction.

Figure 3:
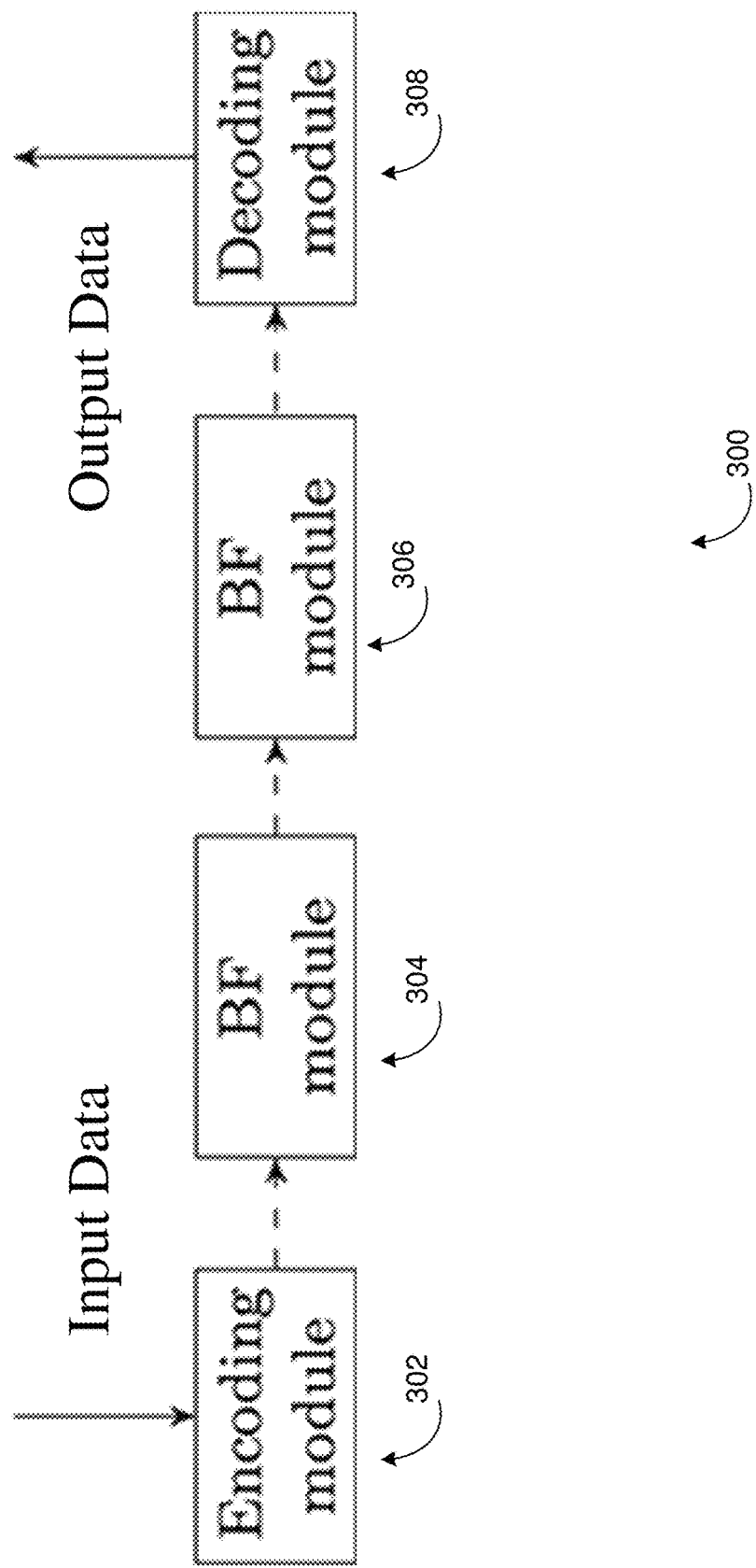
FIG. 3 is a schematic diagram depicting aspects of BATS protocol module correspondence with network nodes in accordance with at least one embodiment of the invention.

To implement BATS codes in a practical network, a BATS protocol for communicating between nodes is established. BATS nodes include one or more of three types of packet data processing modules that implement the BATS protocol: an encoding module, a batch forwarding (BF) module, and a decoding module. FIG. 3 schematically depicts an example arrangement of BATS protocol modules 300 that correspond to the nodes R0, R1, R2, R3 of FIG. 1. The source node 302 (also called the "first node" herein) runs an encoding module that encodes input data (e.g., a discrete data file or continuous data stream), the sink node 308 (also called the "last node" herein) runs a decoding module that decodes the encoded input data to generate output data that corresponds to the input data, and each intermediate node 304, 306 runs a BF module that retransmits the encoded input data.

Figure 4:
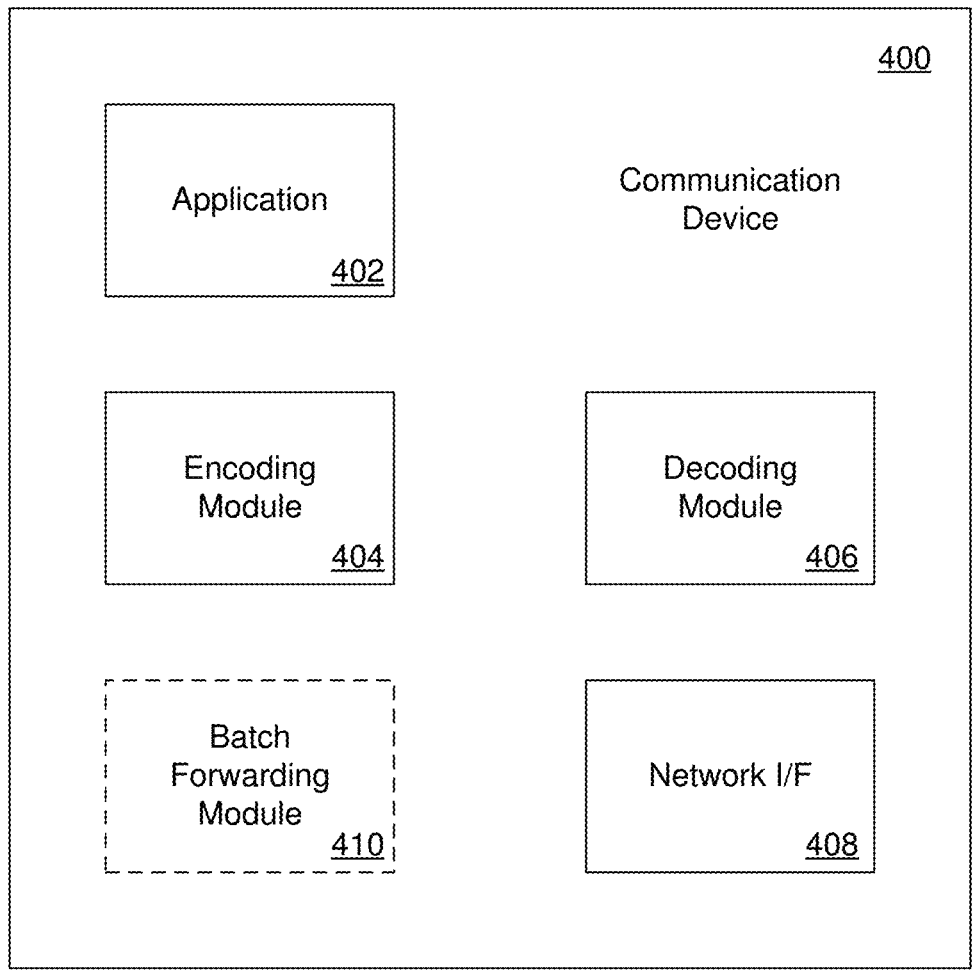
FIG. 4 is a schematic diagram depicting aspects of an example communication device incorporating BATS protocol modules in accordance with at least one embodiment of the invention.

FIG. 4 is a schematic depiction of an example communication device 400 that incorporates BATS protocol modules in accordance with at least one embodiment of the invention. The communication device 400 may implement an application 402 that utilizes BATS protocol modules for communication. For example, the application 402 may interact with an encoding module 404 to encode a data stream (e.g., a source or input data stream), and the encoding module 404 may transmit a BATS encoded data stream over a network utilizing a network interface 408. The communication device 400 may also receive encoded data packets and/or streams. For example, the communication device 400 may receive an encoded data stream with the network interface 408 and provide the encoded data stream to a decoding module 406 to produce a decoded data stream (e.g., a sink or output data stream) that is passed to the application 402 for further processing (e.g., for presentation to a user). The example communication device 400 also includes a batch forwarding module 410. As such, the communication device 400 can act as an intermediate node in a network such as the network 100 depicted in FIG. 1. However, in accordance with alternative embodiments of the invention, and as indicated in FIG. 4 by the dashed line style, communication devices utilizing a BATS protocol need not incorporate the batch forwarding module 410 and/or act as an intermediate node in a network. In accordance with further alternative embodiments, communication devices may include the batch forwarding module 410, but not the encoding module 404 or the decoding module 406. In such embodiments, the communication device may be limited to acting as an intermediate node.

Source nodes such as node R0 in FIG. 1 include the encoding module 404. At a high level, the encoding module may perform operations as follows:
1) Read a data file and/or data stream as input (sometimes called the "input file" or "input data" herein);
2) Generate batches using a BATS encoding algorithm; and
3) Output the encoded data packets of the generated batches in a protocol specific order.

The packets generated by the BATS encoding algorithm may be represented as column vectors over a finite field F of size q. Here the term "field" is used in the sense of abstract algebra. Every packet contains T symbols from F. The input file is divided into K input packets. A matrix can be used to represent a set of packets by juxtaposing them. Fix a degree distribution $\Psi=(\Psi_0, \Psi_1, \ldots, \Psi_D)$, where D is the maximum degree.

A batch may be generated with the following operations:
1) Sample the degree distribution $\Psi$ and obtain a degree d with probability $\Psi_d$;
2) Choose d input packets uniform randomly and form a matrix B by juxtaposing the d packets; and
3) A batch X=BG is generated, where G is a d×M generator matrix over the finite field F (here M is a suitable integer such that G is a d×M generator matrix over the finite field F).

Coefficient vectors are embedded to the packets in a batch, which form an M×M identity matrix over the finite field F. Different batches are generated independently with the above operations. The generator matrix G can be designed deterministically or generated randomly and is known by the BATS decoder (e.g., decoding module 406 and/or its counterpart in another communication device).

To enhance transmission reliability for the input packets, a precode technique first introduced for Raptor codes may be utilized. For example, before applying the batch encoding process, the input packets may be first encoded using a traditional erasure code (called a precode). The batch encoding process may then be applied to the precoded input packets generated by the precode.

The packets of the batches are transmitted through the network. The BF module 410 is employed at intermediate nodes. The BF module 410 may perform operations as follows:
1) Receive encoded packets as input;
2) Generate recoded packets by performing linear coding on packets of the same batch; and
3) Output the packets in a protocol specific order.

Different from conventional network communication protocols such as TCP/IP, an intermediate node can output linear combinations of the packets it has received. Because of this, an intermediate node is sometimes called a recoder or recoding node.

A variety of BF module designs are possible in accordance with at least one embodiment of the invention, with a stipulation that linear combinations are applied to packets only belonging to the same batch. As the operations during linear network coding are linear, a transfer matrix H can be formulated. Juxtaposing the received packets of a batch at the sink node as a matrix Y, we have $$Y=XH=BGH. \quad (1)$$

The size of H depends on a number of received packets of the batch. Suppose r packets are received of the batch, then H is an M×r matrix. The matrix H is known at the decoder by means of the coefficient vectors of the packets.

For n received batches, define $h_r$ as the fraction of the n transfer matrices with rank r. An empirical rank distribution of the transfer matrices $h=(h_0, h_1, \ldots, h_M)$ can facilitate a good degree distribution.

Destination nodes such as node R3 in FIG. 1 include the decoding module 406. At a high level, the decoding module may perform operations as follows:
1) Receive encoded data packets as input;
2) Decode the packets using a BATS decoding algorithm; and
3) Output the decoded data file and/or data stream.

There are multiple decoding algorithms for BATS codes in accordance with at least one embodiment of the invention. The degrees of the batches are preserved during the network transmission so that, for example, an efficient belief propagation (BP) decoding algorithm can be used to jointly decode the received packets. A destination node tries to decode the input packets using Y and the knowledge of G and H for the received batches. A batch is decodable if rk(GH) is equal to the degree d, i.e., the linear system in (1) with B as the variable has a unique solution. The BP decoding of BATS codes keeps looking for decodable batches. If a decodable batch is found, the input packets of this batch are recovered by solving the associated linear system (1) and the recovered input packets are substituted into the batches that have not been solved. If a decodable batch cannot be found, the BP decoding stops. It is demonstrated numerically for general cases that the BATS code with BP decoding achieves rates very close to the average empirical rank $\Sigma_i ih_i$, the theoretical upper bound on the achievable rate of the code in packets per batch.

Another technique is called inactivation. If the number of input packets is very large, the degree distribution optimized asymptotically can perform well. If the number of input packets is relatively small, the BP decoding tends to stop before the desired fraction of input packets are decoded. Using inactivation can continue the decoding process after the BP decoding has stopped. When there are no decodable batches, an undecoded input packet is picked and marked as inactive. The inactive packet is then substituted into the batches like a decoded packet, although the inactive packets are indeterminate. The decoding process is repeated until the input packets are either decoded or inactive. The inactive input packets can be recovered by solving a linear system of equation.

A BATS protocol in accordance with at least one embodiment of the invention called BATSpro-1 is now described. The encoding module 404 outputs the packets of a batch before another batch. The decoding module 406 behaves as described above. The BF module 410 recodes a batch after a packet of a new batch comes. It generates M recoded packets per batch and transmits them before the next recoding process.

Figure 5:
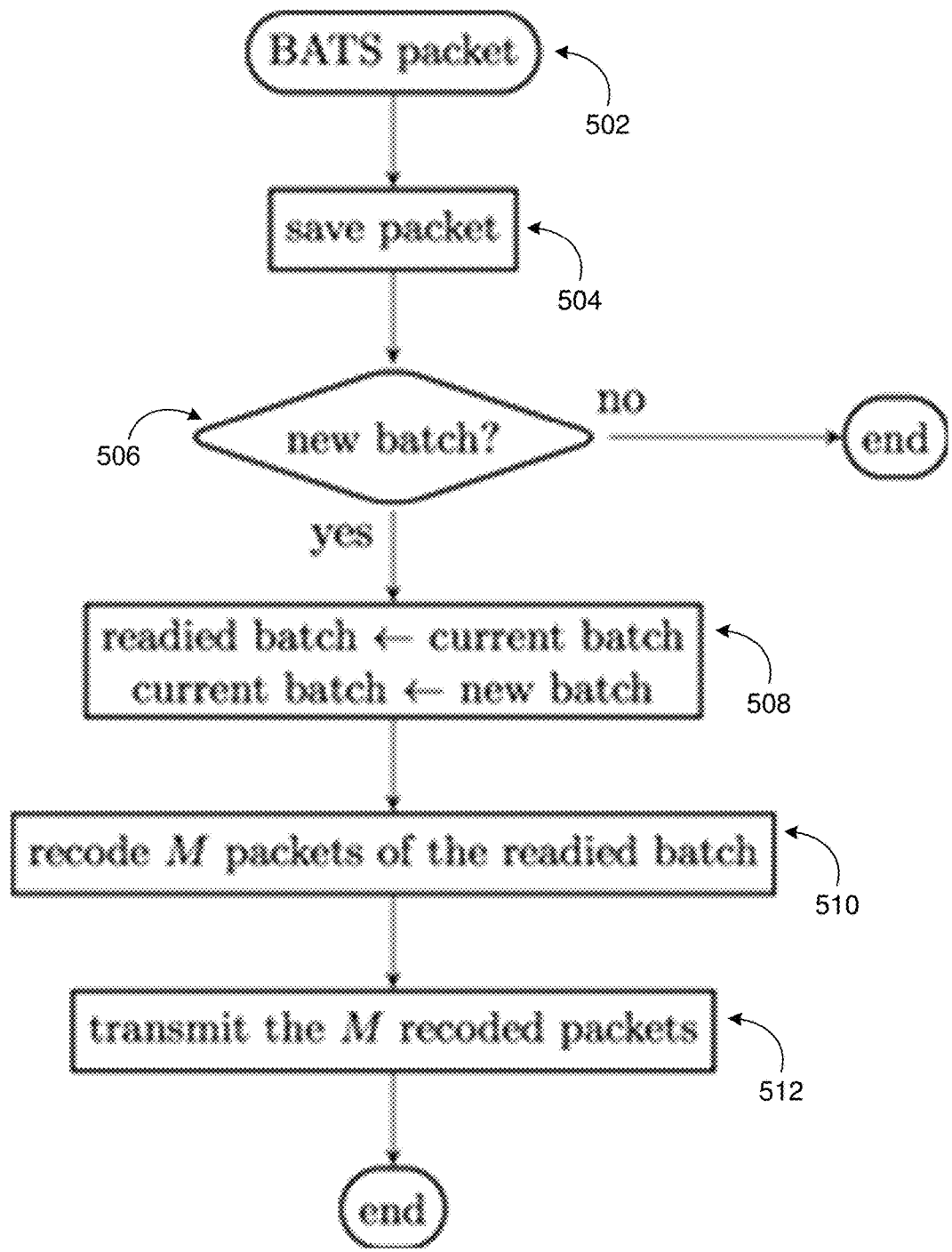
FIG. 5 is a flow chart depicting aspects of an example procedure performed by a BF module in accordance with at least one embodiment of the invention.

FIG. 5 depicts an example procedure 500 that may be performed by the BF module 410 in accordance with at least one embodiment of the invention. A BATS packet may be received (at 502) and saved (at 504). If a new batch is detected (at 506), the current batch becomes the readied batch and a new batch becomes the current batch (at 508). M packets of the readied batch are recoded (at 510), and the M recoded packets are transmitted (at 512).

Systematic recoding is an approach which store-and-forward linearly independent packets. This approach can significant reduce the number of finite field operations (in the sense of abstract algebra) required during the recoding process. Suppose a recoder is going to generate t≥r packets for a batch, where r is the number of correctly received linearly independent packets, i.e., rank of the batch. Instead of generating all t packets by using random linear combinations on the r received packets, only t−r are generated. The remaining r recoded packets are the same as the r received packets, called the systematic recoded packets.

BATSpro-1 can work well when the link loss is independent. However, effectiveness of BATSpro-1 can be reduced when the link loss is bursty. Burst loss is a common phenomenon in wireless transmission due to interference and fading. In addition, in practice, the length of a burst error is not fixed.

In accordance with at least one embodiment of the invention, a block interleaver can transform the burst loss into nearly random loss (e.g., such that loss patterns have a white noise character). A set of batches (e.g., multiple batches) forms a block. The size of the block is referred to as the depth of the interleaver, denoted by L. After a packet of a new block comes, the node performs recoding on the batches in the previous block. It generates M recoded packets per batch and transmits one packet of each batch in a round-robin manner until it transmits all recoded packets of this block.

Figure 6:
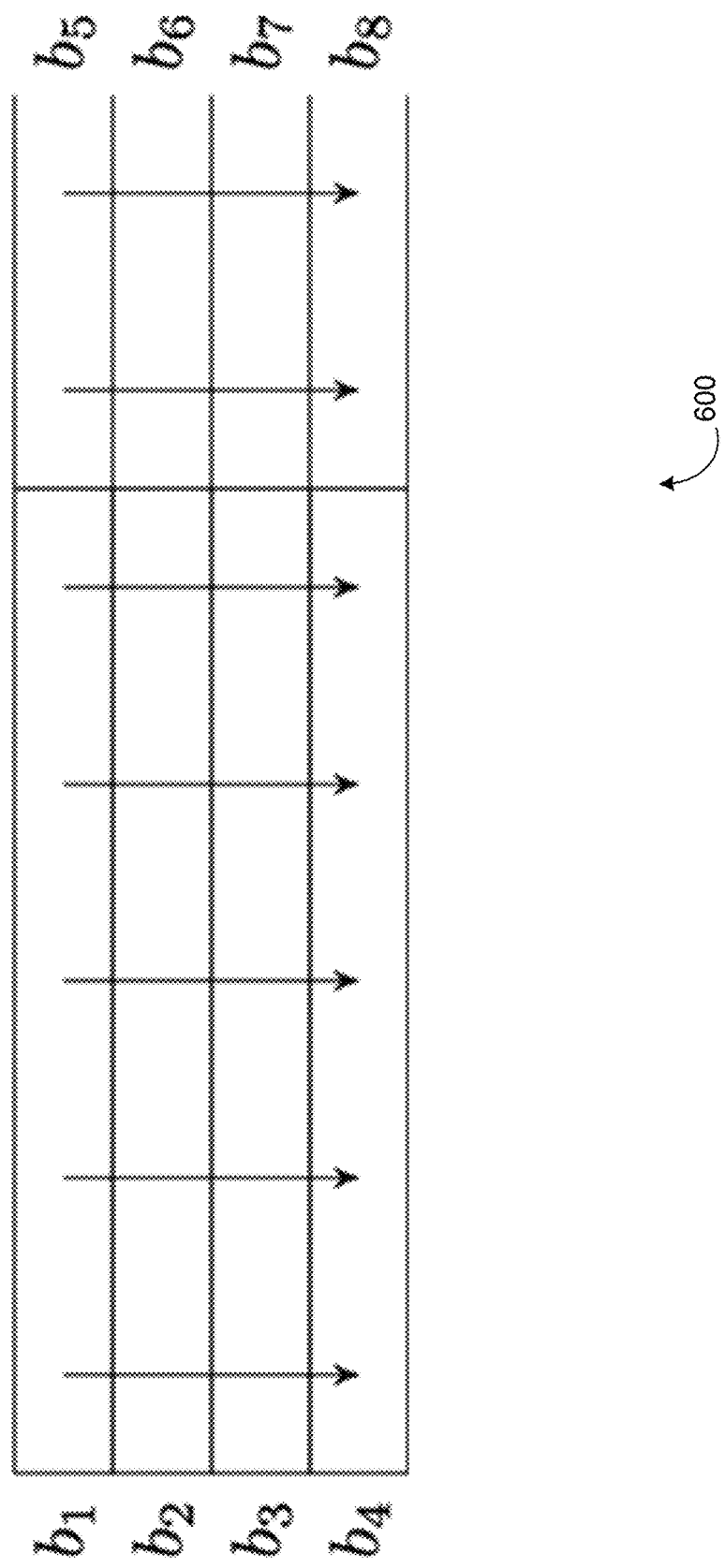
FIG. 6 is a schematic diagram depicting aspects of an example block interleaving scheme in accordance with at least one embodiment of the invention.
Figure 7:
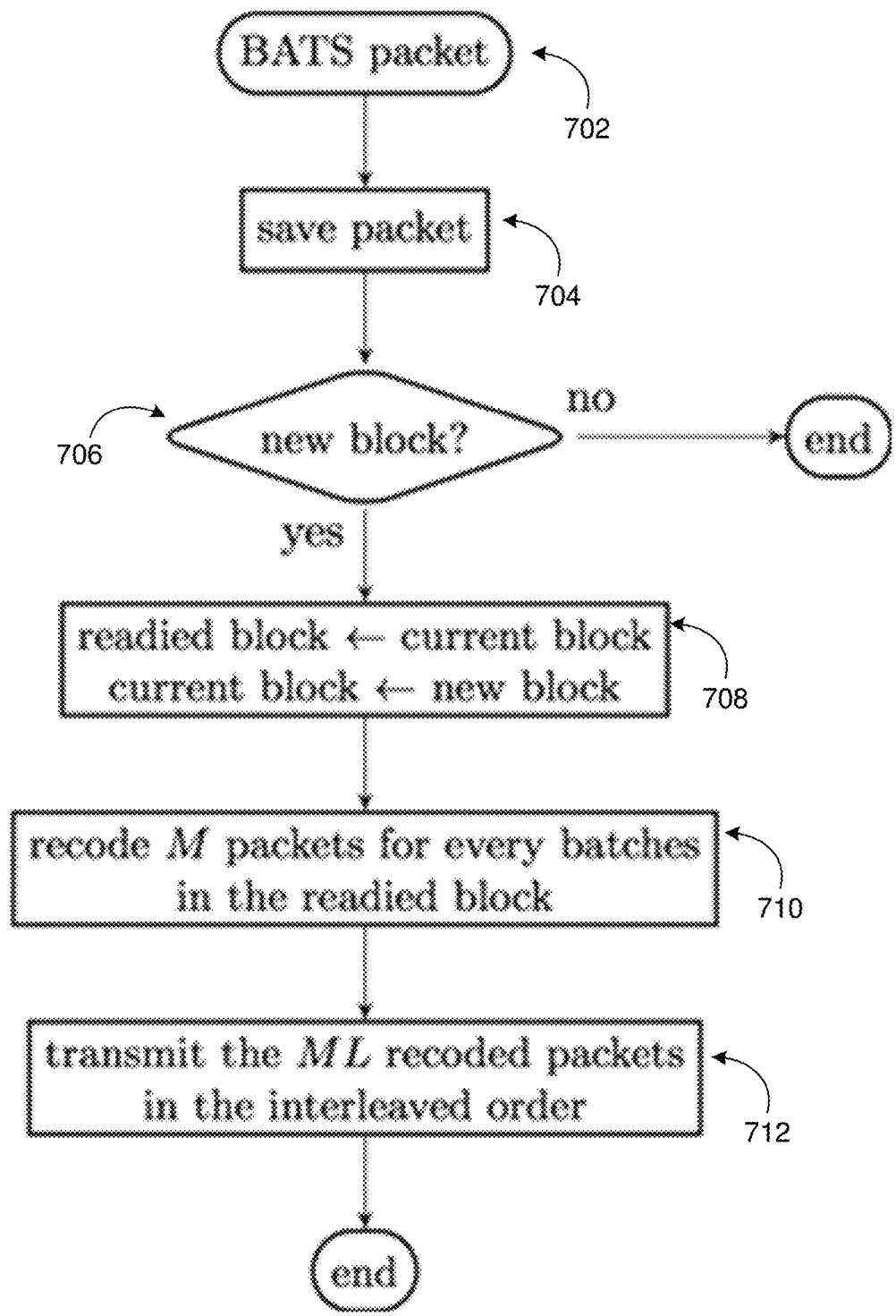
FIG. 7 is a flow chart depicting aspects of an example procedure performed as part of an interleaved BATSpro-1 communication protocol in accordance with at least one embodiment of the invention.

FIG. 6 shows an example of a block interleaving scheme 600 with depth 4. Each rectangle represents a batch and the length represents the number of recoded packets. The number of packets of different batches are the same. The arrows represent transmission sequences generated by the block interleaver. FIG. 7 depicts an example procedure 700 that may be performed by the BF module 410 to implement interleaved BATSpro-1 in accordance with at least one embodiment of the invention. A BATS packet may be received (at 702) and saved (at 704). If a new block is detected (at 706), the current block becomes the readied block and a new block becomes the current block (at 708). The packets of each batch in the readied block are recoded into M packets (at 710), and the ML recoded packets are transmitted in the interleaved order (at 712), for example, utilizing the block interleaving scheme 600 depicted in FIG. 6.

For a recoder, packet loss may present in the previous link. The rank of a received batch is at most the same as the rank of the same batch in the previous hop. The decoding process depends on the linearly independent packets in a batch, and the achievable rate of BATS codes is close to the expected rank per batch. A goal of a BF module is to optimize (e.g., maximize) a total number of linearly independent packets in different batches that will be received in the next hop, e.g., maximize a sum of the transfer matrix ranks of the batches in the next hop.

For example, suppose the recoder received a batch with rank 1. In BATSpro-1, the recoder generates M packets for this batch. The M recoded packets are linearly dependent. The next hop only needs one of the M packets to retrieve the whole batch, and the other correctly received packets are overheads. In accordance with at least one embodiment of the invention, it is possible to adaptively assign fewer recoded packets to batches with lower rank and more packets to batches with higher rank. This scheme is called adaptive recoding, which is a feature of an improved protocol, BATSpro-2.

Figure 8:
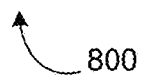
FIG. 8 is a pseudocode listing representing an example algorithm for optimizing a number of data packets in each batch in accordance with at least one embodiment of the invention.

In BATSpro-2, an operation is to determine an optimal number of recoded packets before the recoding process. This process is called pre-recoding herein. Given a packet loss probability p of the next hop. A table of:

$$\beta_p(y, x) = \begin{cases} 1, & \text{if } y < x \\ \sum_{i=0}^{x-1} B_p(y, i), & \text{otherwise} \end{cases}$$

where $\beta_P(t, i) = \begin{cases} \binom{t}{i}(1-p)^i p^{t-i}, & \text{if } 0 \le i \le t \\ 0, & \text{otherwise} \end{cases}$ may be precomputed for a set L of batches. Let the recoder generate $t_b$ packets for the batch b in L. Let the sum of $t_b$ be equal to $t_{max}$, a maximum number of recoded packets for this set of batches. Then the algorithm 800 depicted in FIG. 8 can find the set of $t_b$ with maximum expected rank on the next hop. The algorithm 900 depicted in FIG. 9 is an approximate alternative to the algorithm 800, more useful in practice. The algorithm 1000 depicted in FIG. 10 can modify the results of an approximate scheme, such as the output of algorithm 900, into a more optimal solution. In algorithms 800, 900 and 1000, the symbol $r_b$ represents a rank of batch b (e.g., the rank of the transfer matrix associated with batch b and/or a statistically observed rank of the batch such as with respect to linearly independent received data packets of a batch).

With adaptive recoding, the number of recoded packets in different batches may differ. At times, the number of recoded packets can exceed M, thus the block interleaver cannot work in the way described above. For the source node, a standard block interleaver works well because every batch has M packets.

Figure 11:
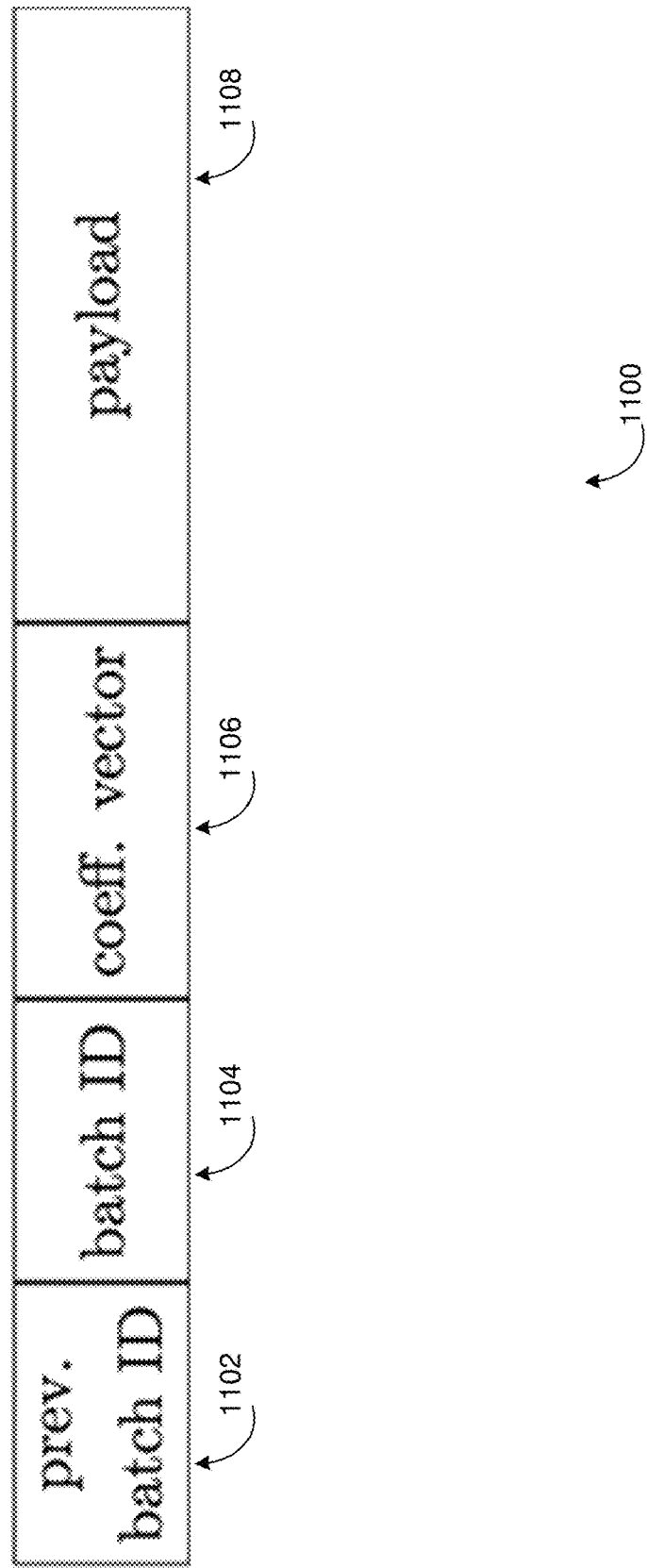
FIG. 11 is a schematic diagram depicting aspects of an example BATSpro-2 data packet format in accordance with at least one embodiment of the invention.

In accordance with at least one embodiment of the invention, the interleaver may be applied on multiple data streams. One batch appears in one data stream. Another batch follows the previous batch in a stream. FIG. 11 shows an example data packet design for BATSpro-2 in accordance with at least one embodiment of the invention. The batch ID field 1104 is used to identify different batches. Here the term "field" is used in the sense of information processing, e.g., a pre-defined portion of a data record. The coefficient vector 1106 is a column in the transfer matrix. The payload 1108 is the encoded/recoded data. The previous batch ID 1102 is the batch ID of the previous batch in the same data stream. The four fields (prev. batch ID, batch ID, coeff. vector, payload) of a packet p are denoted by $p^J$, $p^I$, $p^C$ and $p^B$ respectively.

Figure 12:
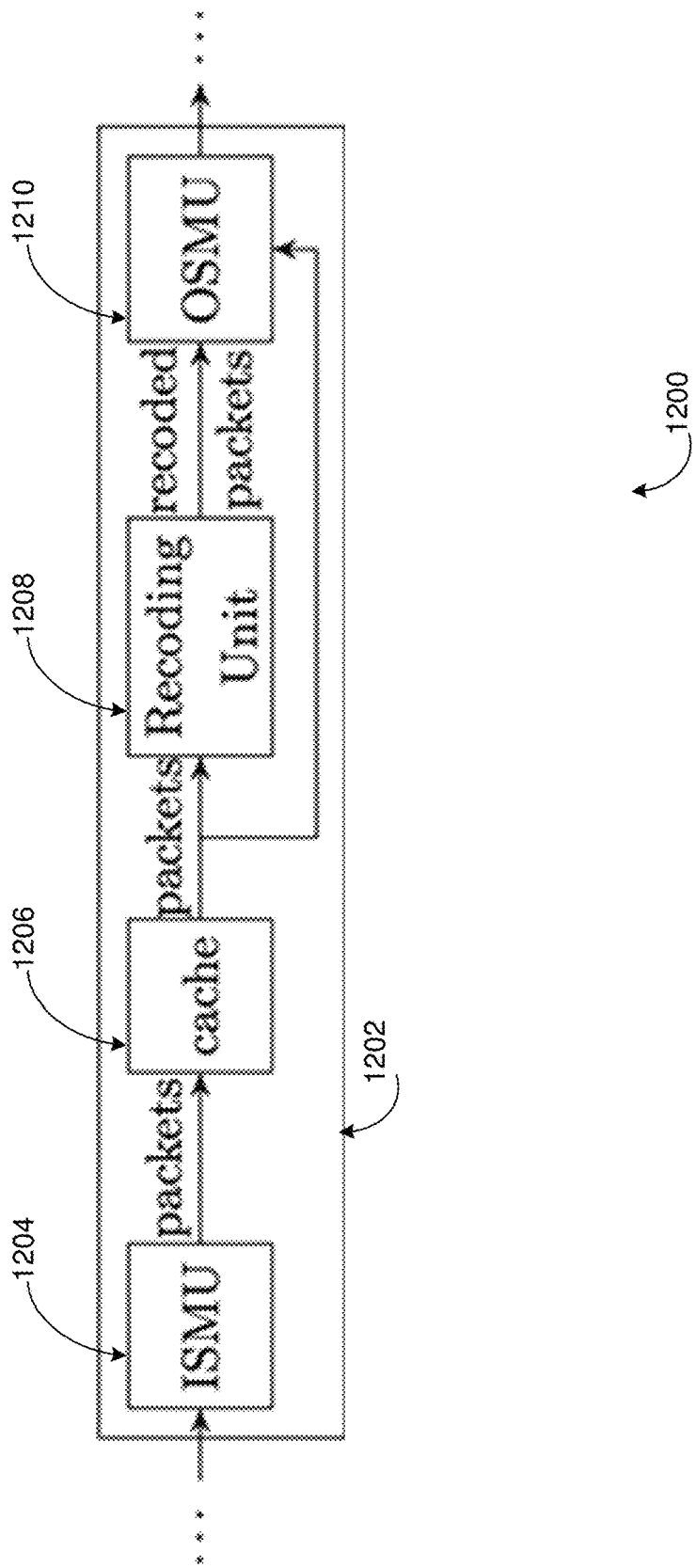
FIG. 12 is a schematic diagram depicting aspects of an example submodule structure for a BATSpro-2 BF module in accordance with at least one embodiment of the invention.

In accordance with at least one embodiment of the invention, the encoding and decoding modules for BATSpro-2 may be similar to those of BATSpro-1. However, the BF module for BATSpro-2 may differ. FIG. 12 depicts an example submodule structure 1200 for a BATSpro-2 BF module 1202 in accordance with at least one embodiment of the invention. The incoming packets are passed to an Input Stream Management Unit (ISMU) 1204, which handles out-of-order packets and indicates finished batches. The ISMU outputs non-out-of-order packets and these packets are stored in a cache 1206. The Recoding Unit 1208 reads packets of finished batches from the cache and preforms pre-recoding and recoding procedures to generate recoded packets. The Output Stream Management Unit (OSMU) 1210 manages data streams, assigns batches to different data streams and transmits the streams in an interleaved order. The packets for the data streams are from the Recoding Unit (recoded packets) and the cache (systematic recoded packets). The recoded packet may correspond to a received packet except for the field $p^J$.

The ISMU 1204 may implement the following functions:
1) recognize different input data streams;
2) identify finished batches;
3) handle broken streams; and
4) handle out-of-order packets.

The input packets are in an interleaved order with packet loss. Packet jitter may present in the channel so the existence of lost packets cannot be detected by the difference in received time. In accordance with at least one embodiment of the invention, it is necessary to distinguish different data streams as the information indicating finished batches, e.g., utilizing the $p^J$ field of a packet, depends on its data stream.

Figure 13:
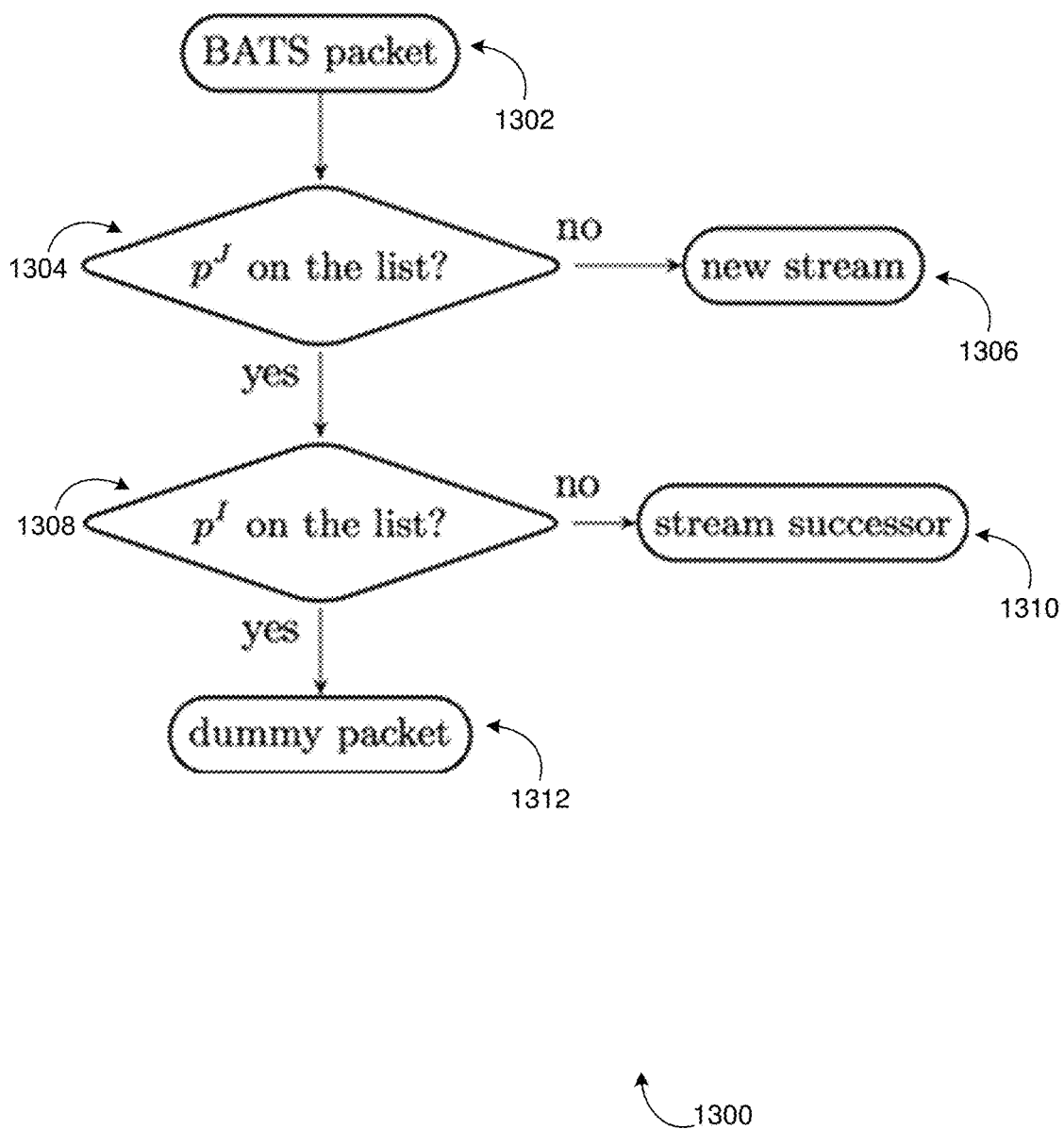
FIG. 13 is a flowchart depicting example operations for recoding in accordance with at least one embodiment of the invention.

FIG. 13 depicts an example procedure 1300 performed by the ISMU 1204 in accordance with at least one embodiment of the invention. The ISMU 1204 manages an active list which records the current batch ID on the input data streams. The list is empty at the beginning Here assume there are no out-of-order packets. At 1302, a BATSpro-2 packet is received. If the field $p^J$ of a packet is not on the list (decision at 1304), then the packet is considered in a new unrecognized data stream (at 1306). The batch ID of the packet is added to the list. If $p^J$ is on the list but not $p^I$ (decision at 1308), then the packet indicates the previous batch (with batch ID $p^J$) is a finished batch. The batch ID of the packet replaces the item valued $p^J$ on the list and succeeds the data stream (at 1310). If $p^J$ equals $p^I$ and it is on the list, then it is a dummy packet, indicates the batch is a finished batch (at 1312). It is an error if $p^I$ is on the list but not $p^J$. This means two streams are receiving the same batch. It can be handled by merging the two streams together. After recognizing a finished batch, the batch ID is sent to the Recoding Unit 1208.

Figure 14:
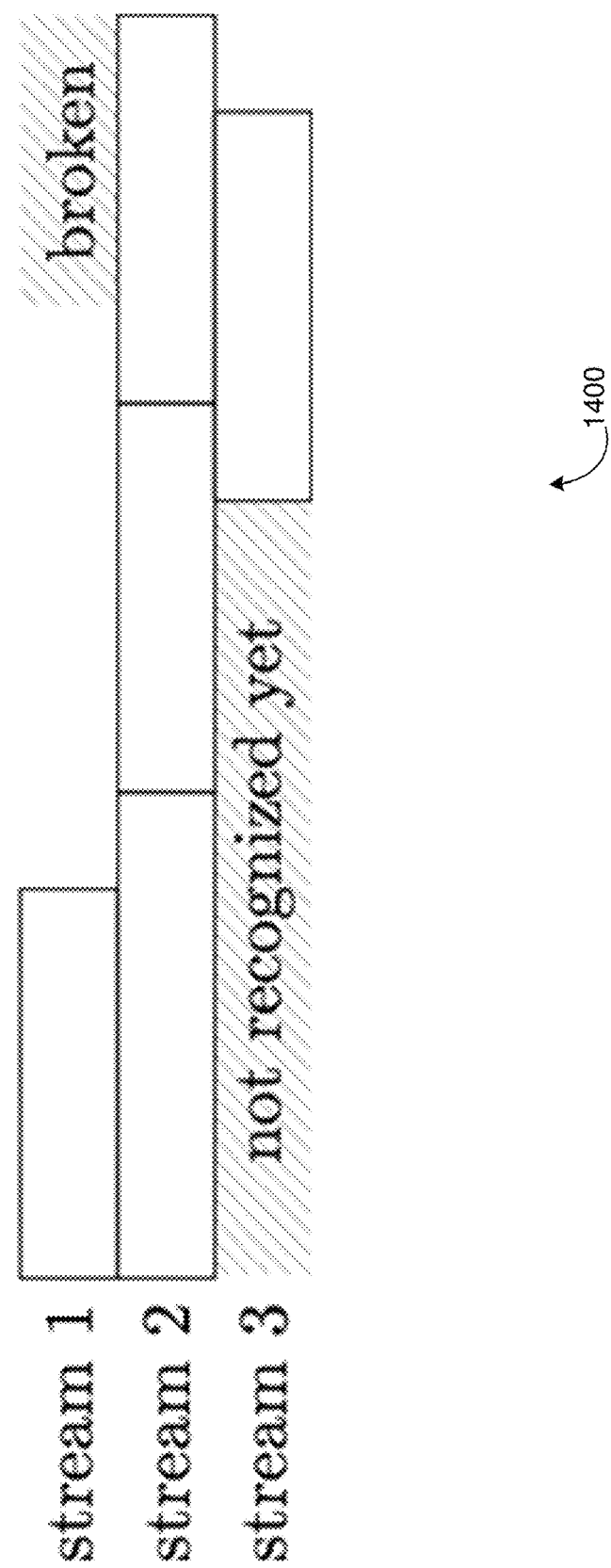
FIG. 14 is a schematic diagram depicting aspects of an example data stream states in accordance with at least one embodiment of the invention.

Suppose the packets of the succeeding batch are lost. The $p^J$ of following packets of the data stream cannot match any items in the active list. In this case, the packets are considered in a new data stream. A timeout is set to each data stream. If there is no newly received packet on a data stream, the stream is considered as a broken stream. The last batch in the stream is treated as a finished batch. The corresponding item in the active list is removed. FIG. 14 shows an example of this scenario 1400 (stream 1 is broken, stream 3 is not yet recognized).

A function of the cache 1206 is to provide storage to support read and write of packets in a batch. Statistical data like the rank of a batch is recorded for the use of other submodules. The cache stores and groups packets according to their batch ID. As an output data stream only read a batch at a time, the cache can act as the storage of the streams if it also stores the recoded packets.

There are two flags designed for every batches: 'recoded' and 'chosen'. When the Recoding Unit 1208 generated the recoded packets of a batch, e.g., the number resulted by the pre-recoding process, the flag 'recoded' is marked. It indicates the OSMU 1210 does not need to wait for more packets of this batch. The flag 'chosen' is marked if the OSMU selected the batch to a data stream. When the 'chosen' flag is up, the cache will send the batch ID to the Recoding Unit which indicates the batch is ready to perform recoding after it has become a finished batch.

The Recoding Unit 1208 generates recoded packets when a block of batches finishes the pre-recoding process. When there are enough 'chosen' finished batches, the number of recoded packets for the batches are calculated the pre-recoding scheme. After that, recoded packets are generated and stored in the cache. The flag 'recoded' in the cache is marked after storing the last recoded packet of the batch.

The OSMU 1210 may implement the following functions:
1) assign batches to the output data streams;
2) read packets for the data streams from other submodules; and
3) output the data streams in an interleaved order.

Figure 15:
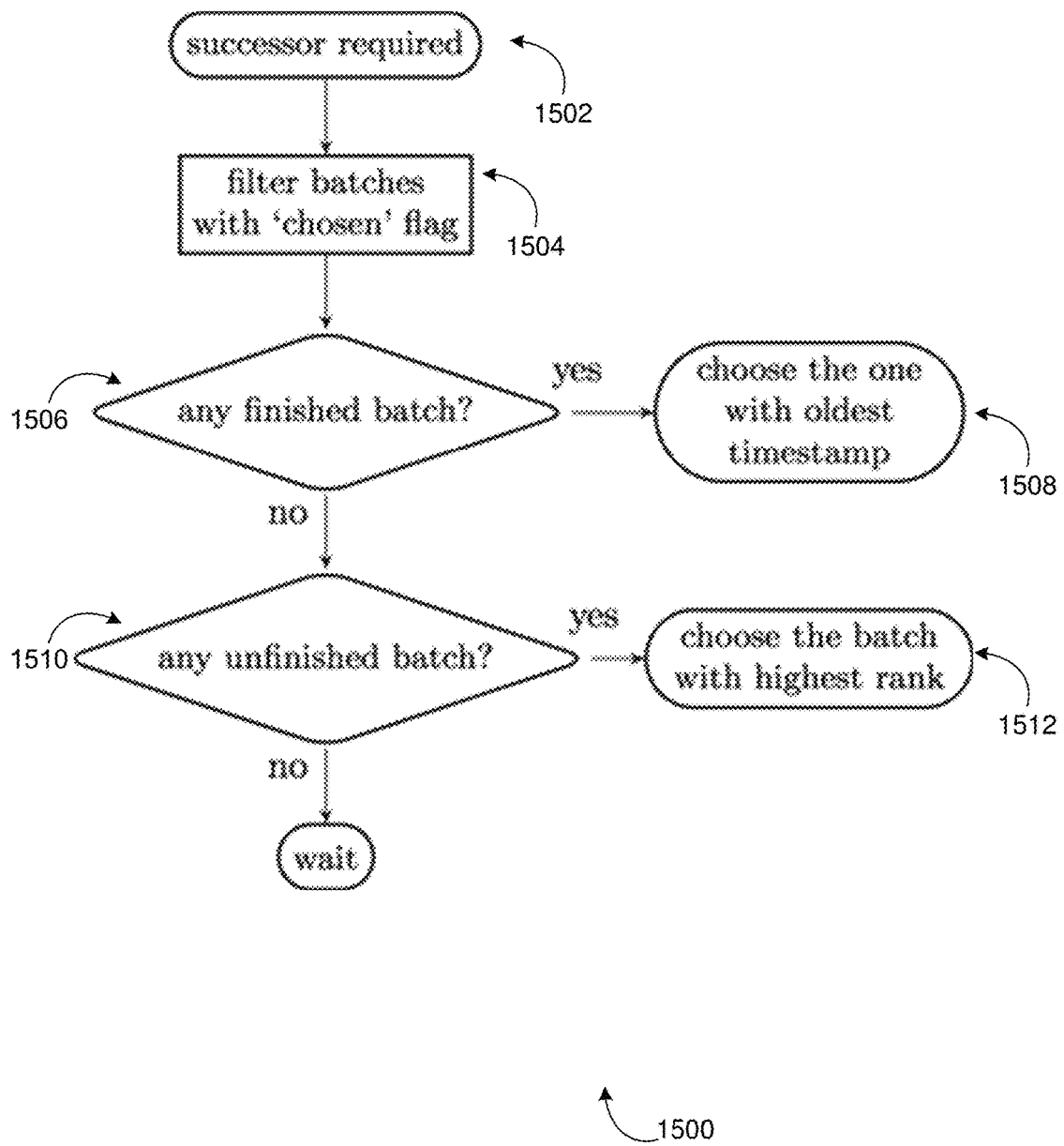
FIG. 15 is a flowchart depicting example operations for recoding in accordance with at least one embodiment of the invention.

The OSMU 1210 manages the current batch ID of the output data streams. When the last packet of a batch in a stream is transmitted, the unit chooses a batch from the cache as a successor. The successor batch is marked with 'chosen' in the cache. A candidate of the successor is a batch without the flag 'chosen' marked in the cache. The priority of the candidates is given to finished batches with oldest timestamp of first received packet. If there are no finished batches, the priority is given to unfinished batches with highest rank. If there are multiple candidates with the same priority, choose any one randomly. If there are no candidates, the OSMU 1210 stops the transmission and waits until there are candidates. FIG. 15 depicts an example procedure 1500 that may be performed by the OSMU 1210 to choose a successor in accordance with at least one embodiment of the invention. At 1502, it is detected that a successor is required. Batches without the 'chosen' flag in the cache are considered (at 1504). Finished batches have higher priority than unfinished batches. Among the finished batches (detected at 1506), the one with oldest timestamp of the first received packet is chosen (at 1508). If there is no finished batches (detected at 1510), the unfinished batch with highest rank is chosen (at 1512). The OSMU waits and repeats this flow to find a successor if no candidate is chosen in this round.

The adaptive recoding scheme results batches with different numbers of recoded packets. After one of the data stream transmitted the recoded packets of a batch, the stream is empty and the OSMU 1210 chooses a batch, probably an unfinished batch, as a successor. If it is an unfinished batch, the Recoding Unit 1208 has not recoded this batch yet. With the fact that systematic recoded packets are the same as the received packets, the OSMU 1210 can fill in the gap using the systematic recoded packets if available. Otherwise the OSMU 1210 fills in dummy packets.

Suppose the currently received packets (systematic recoded packets) are transmitted so the data stream is empty, the OSMU 1210 waits for more recoded packets. The output of the OSMU 1210 is in an interleaved order.

Figure 16:
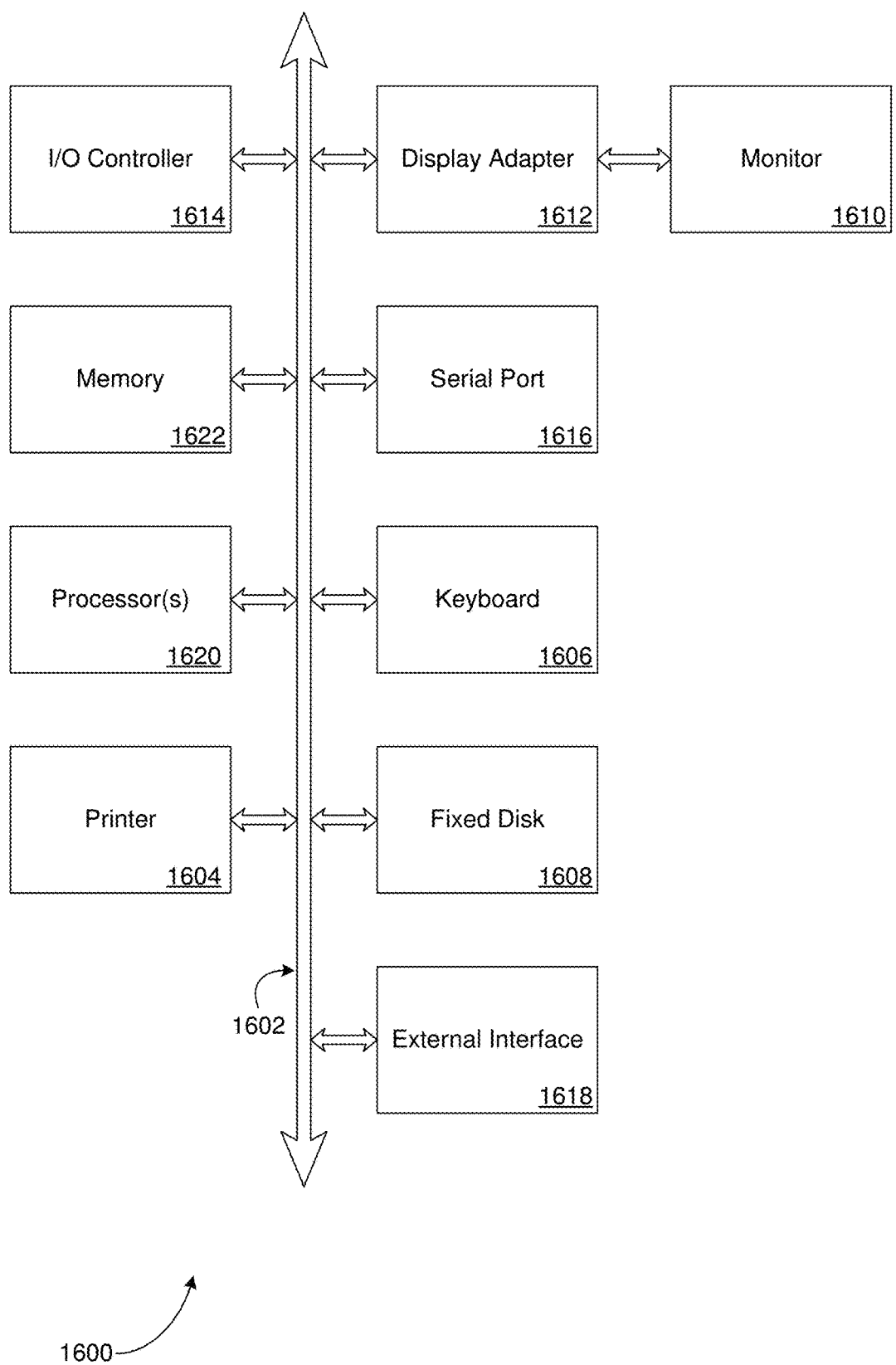
FIG. 16 is a schematic diagram depicting aspects of an example computing device in accordance with some embodiments of the present invention.

In accordance with at least some embodiments, the system, apparatus, methods, processes and/or operations for message coding may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 16 depicts aspects of elements that may be present in a computer device and/or system 1600 configured to implement a method and/or process in accordance with some embodiments of the present invention. The subsystems shown in FIG. 16 are interconnected via a system bus 1602. Additional subsystems such as a printer 1604, a keyboard 1606, a fixed disk 1608, a monitor 1610, which is coupled to a display adapter 1612. Peripherals and input/output (I/O) devices, which couple to an I/O controller 1614, can be connected to the computer system by any number of means known in the art, such as a serial port 1616. For example, the serial port 1616 or an external interface 1618 can be utilized to connect the computer device 1600 to further devices and/or systems not shown in FIG. 16 including a wide area network such as the Internet, a mouse input device, and/or a scanner. The interconnection via the system bus 1602 allows one or more processors 1620 to communicate with each subsystem and to control the execution of instructions that may be stored in a system memory 1622 and/or the fixed disk 1608, as well as the exchange of information between subsystems. The system memory 1622 and/or the fixed disk 1608 may embody a tangible computer-readable medium.

It should be understood that the present invention as described above can be implemented in the form of control logic using computer software in a modular or integrated manner. Alternatively, or in addition, embodiments of the invention may be implemented partially or entirely in hardware, for example, with one or more circuits such as electronic circuits, optical circuits, analog circuits, digital circuits, integrated circuits ("IC", sometimes called a "chip") including application-specific ICs ("ASICs") and field-programmable gate arrays ("FPGAs"), and suitable combinations thereof. In particular, the encoder and/or decoder describe above with reference to FIG. 2 may be partially or entirely implemented in hardware. As will be apparent to one of skill in the art, notions of computational complexity and computational efficiency may be applied mutatis mutandis to circuits and/or circuitry that implement computations and/or algorithms. Based on the disclosure and teachings provided herein, a person of ordinary skill in the art will know and appreciate other ways and/or methods to implement the present invention using hardware and/or a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein. Appendix A and Appendix B may provide context and/or additional details with respect to one or more embodiment of the invention described above.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method for device-facilitated communication, the method comprising:
   receiving, at a recoding node of a communication network, data packets associated with a batch of data packets encoded in accordance with a random linear network coding scheme based at least in part on a generating matrix having a first rank;
   determining, by the recoding node, a second rank of correctly received linearly independent data packets of the batch, the second rank being different from the first rank;
   recoding, by the recoding node, the batch of data packets at least in part by (i) generating a number of explicitly new random linear combinations of the received data packets as recoded data packets, the generated number of recoded data packets based at least in part on an arithmetic difference between the first rank and the second rank and (ii) providing data packets corresponding to the correctly received linearly independent data packets of the batch as remaining data packets in the recoded batch; and
   providing the recoded batch of data packets for propagation to a decoding node.

2. The method in accordance with claim 1, wherein batch of data packets is encoded by a communication device to facilitate communication of audio, video or multimedia data.

3. The method in accordance with claim 1, wherein the decoding node decodes the recoded batch of data packets and provides the decoded batch of data packets for generating a presentation to a user.

4. The method in accordance with claim 1, wherein the first rank corresponds to a rank of a transfer matrix associated with the received batch of data packets.

5. The method in accordance with claim 1, wherein the batch of data packets is received from an encoding node or else another recoding node.

6. The method in accordance with claim 1, wherein the recoded batch of data packets is sent to another recoding node or else a decoding node.

7. An apparatus for device-facilitated communication, the apparatus comprising a recoding component configured to, at least:
   receive data packets associated with a plurality of batches of data packets encoded in accordance with a random linear network coding scheme based at least in part on a generating matrix, the plurality of batches of data packets divided into blocks each having a pre-determined number of batches greater than one;

recode each batch in a block of batches in accordance with the random linear network coding scheme and inhibit sending of recoded data packets of a batch in the block of batches until the recoding of each batch in the block of batches is complete, each batch comprising a plurality of data packets that are explicitly new random linear combinations of received data packets; and provide the recoded data packets for propagation to one or more decoding nodes at least in part by interleaving recoded data packets selected from different batches in the block of batches in a transmission order.

8. The apparatus in accordance with claim 7, further comprising a communication device incorporating the recoding component.

9. The apparatus in accordance with claim 7, wherein the interleaving is performed in a round-robin manner with respect to the batches in the block of batches.

10. The apparatus in accordance with claim 7, wherein the interleaving transforms a burst loss pattern associated with the received data packets into a substantially random loss pattern.

11. The apparatus in accordance with claim 7, wherein determining that the recoding of each batch in the block of batches is complete comprises receiving a data packet associated with a different block.

12. One or more non-transitory computer-readable media collectively having thereon computer-executable instructions that configure one or more devices to collectively, at least:

receive data packets associated with a plurality of batches of data packets encoded in accordance with a random linear network coding scheme based at least in part on a generating matrix, the plurality of batches of data packets divided into blocks each having a pre-determined number of batches greater than one;

recode a block of batches utilizing transfer matrices of differing rank such that fewer recoded data packets are assigned to batches with lower transfer matrix rank relative to other batches in the block and more recoded data packets are assigned to batches with higher transfer matrix rank relative to other batches in the block, the recoded batches having different numbers of data packets, each data packet being an explicitly new random linear combination of received data packets; and providing the recoded batches of data packets for propagation to one or more decoding nodes.

13. The one or more non-transitory computer-readable media in accordance with claim 12, wherein the recoding is performed by a recoding component and the recoding component is further configured to determine an optimal number of recoded data packets to assign to each batch prior to recoding the block of batches.

14. The one or more non-transitory computer-readable media in accordance with claim 12, wherein the recoding is performed by a recoding component and the recoding component is further configured to allocate the recoded batches to a plurality of data streams and interleave data packets of recoded batches in at least one data stream of the plurality of data streams.

15. The one or more non-transitory computer-readable media in accordance with claim 14, wherein each recoded data packet incorporates a first batch identifier identifying a first batch containing the recoded data packet and a second batch identifier identifying a second batch in a data stream that contains the first batch and the second batch.

16. The one or more non-transitory computer-readable media in accordance with claim 15, wherein the second batch identifier identifies a previous batch in the data stream.

17. The one or more non-transitory computer-readable media in accordance with claim 14, wherein batches are selected for data streams at least in part by assigning priority values to candidate batches awaiting recoding.

18. The one or more non-transitory computer-readable media in accordance with claim 17, wherein a priority value of a candidate batch is based at least in part on a transfer matrix rank associated with the candidate batch.

19. The one or more non-transitory computer-readable media in accordance with claim 12, wherein the number of data packets in each batch are determined least in part by optimizing total expected rank associated with the plurality of batches for a next communication link.

20. The one or more non-transitory computer-readable media in accordance with claim 19, wherein optimizing total expected rank comprises subtracting a statistically determined rank of each batch from a total possible rank of the plurality of batches.

* * * * *